United States Patent

Cox

[11] Patent Number: 5,819,712
[45] Date of Patent: Oct. 13, 1998

[54] AIR AND FUEL SYSTEM FOR CARBURETOR AND FUEL INJECTION SYSTEMS

[76] Inventor: Carl C. Cox, Rte. 4, Box 367, Galax, Va. 24333

[21] Appl. No.: 838,602

[22] Filed: Apr. 10, 1997

[51] Int. Cl.⁶ .................................................. F02M 25/10
[52] U.S. Cl. .................. 123/585; 123/588; 123/142.5 R; 123/545; 123/553; 123/555
[58] Field of Search ............................. 123/142.5 R, 585, 123/588, 543, 545, 553, 555, 567

[56] References Cited

U.S. PATENT DOCUMENTS

| | | | |
|---|---|---|---|
| 3,877,450 | 4/1975 | Meeks | 123/567 |
| 3,961,609 | 6/1976 | Gerry | 123/567 |
| 4,414,932 | 11/1983 | Lindberg | 123/543 |
| 4,681,071 | 7/1987 | Smith | 123/567 |
| 5,040,517 | 8/1991 | Cox | 123/545 |
| 5,040,518 | 8/1991 | Hamm | 123/545 |

FOREIGN PATENT DOCUMENTS 28 06 763  8/1979  Germany ............................... 123/567
2 172 559  9/1986  United Kingdom ................... 123/567

*Primary Examiner*—Erick R. Solis

[57] ABSTRACT

An air and fuel system for carburetor and fuel injection engines that regulates the temperature of air and fuel that is mixed in the carburetor or fuel injector prior to introduction to the cylinders of the engine. A heater and associated filter located at the air intake side of the carburetor are activated by circulating heated fluid (coolant) contained within the engine cooling system. The coolant passes through the heater and an isolated chamber or conductor and the fuel line passes inside the coolant line within the heater surroundings so that air and fuel can be temperature regulated. Valves in the fuel line allow for proper mixture of air and fuel. A filter is sized to fit inside or outside the heater, and the heater and filter are encompassed by a cover to hold the components together. Oxygen is introduced to the system to reduce air pollution, and oxygen and fuel vapors are combined prior to entering the combustion chamber to create a high explosive fuel that burns efficiently and thereby reduces air pollution.

12 Claims, 6 Drawing Sheets

5,819,712

AIR AND FUEL SYSTEM FOR CARBURETOR AND FUEL INJECTION SYSTEMS

BACKGROUND OF THE INVENTION

1. Field of the Invention

This invention relates to automotive engine economic and operational efficiencies and more particularly to an automotive accessory that regulates the temperature of air and fuel entering the carburetor of an automotive engine to eliminate carburetor malfunctions associated with inclement weather, improve fuel efficiency, and prevent stalling and overheating and lower the carbon monoxide concentration being emitted through the exhaust system.

2. Description of the Prior Art

There are a number of devices that have been used to heat either air flowing to the carburetor of an automotive engine or fuel being directed to mix with that air. Some of these devices equip carburetors with special passages that carry hot exhaust gases therearound so that the area surrounding the throttle plate of the carburetor is heated. Another technique utilized in the past is to provide a water jacket for the carburetor which is connected to the cooling system of the vehicle.

Most of the older prior art devices require a rather major redesign of the carburetor itself or the addition of expensive and highly technical and complicated components which require considerable attention to assure reliable operation. In some cases, the installation of such devices require a rather significant modification to the engine of the automobile which cannot be returned to its original condition without expensive redesign.

For a more recent development in this area, reference is made to my U.S. Pat. No. 5,040,517 directed to a carburetor preheater wherein a kit form of air heater is provided so that existing engines of every kind and description can be equipped with an air warming heater, thus providing more efficient fuel utilization and engine reliability than previously available. While this air heater is an advance in the art, there is still a need for an inexpensive and efficient automotive accessory that will regulate the temperature of air and fuel entering the carburetor so as to eliminate carburetor freeze-ups associated with cold weather and high humidity conditions, improve fuel efficiency by allowing the engine to operate at peak performance, prevent engine stalling in winter and overheating in summer, and enable a do-it-yourself individual to install the device as a kit. It is to that need that the present improvement is directed.

SUMMARY OF THE INVENTION

The present invention is an improvement in an automotive fuel and air regulating system which regulates the temperature of the air/fuel mixture entering in the carburetor which is thereafter introduced to the cylinders of the engine for combustion. It includes a heater, preferably circular in configuration, and having one or more coolant lines therein which surrounds a filter that is positioned at the air intake side of the carburetor. The fuel line of the engine extends inside the coolant line within the heater so that heating of both air and fuel, ultimately to the state of vaporization, is achieved. A cover substantially encompasses the heater and the encircled filter and is secured in place by suitable releasably securing means. The heater and its associated elements are releasably fastened at the air intake side of the carburetor so that air entering the air intake side of the carburetor is warmed by the heater. The location of the various elements and the provision of fuel line controls enable a highly efficient mixture of air and fuel vapor resulting in a more efficient combination being directed to the cylinders for combustion. Fuel line controls enable seasonal adjustment of the fuel/air mixture to accommodate whatever weather conditions are experienced.

Thus, there has been outlined the more important features of the invention in order that the detailed description that follows may be better understood and in order that the present contribution to the art may be better appreciated. There are, of course, additional features of the invention that will be described hereinafter and which will form the subject matter of the claims appended hereto. In this respect, before explaining at least one embodiment of the invention in detail, it is to be understood that the invention is not limited in its application to the arrangement of the components set forth in the following description or illustrated in the drawings. The invention is capable of other embodiments and of being practiced and carried out in various ways.

It is also to be understood that the phraseology and terminology employed herein are for the purpose of description and should not be regarded as limiting in any respect. Those skilled in the art will appreciate that the concept upon which this disclosure is based may readily be utilized as the basis for designing other structures, methods and systems for carrying out the several purposes of this development.

It is important that the claims be regarded as including such equivalent methods and products resulting therefrom that do not depart from the spirit and scope of the present invention. The application is neither intended to define the invention of the application, which is measured by its claims, nor to limit its scope in any way.

Thus, the objects of the invention previously set forth along with the various features of novelty which characterize the invention, are noted with particularity in the claims annexed to and forming a part of this disclosure. For a better understanding of the invention, its operating advantages and the specific results obtained by its use, reference should be made to the following detailed specification taken in conjunction with the accompanying drawings wherein like characters of reference designate like parts throughout the several views.

DETAILED DESCRIPTION OF THE PREFERRED EMBODIMENT

The basic operation of an automotive engine, including the heating, cooling and mixing of fuel and air, is described in detail in my prior U.S. Pat. No. 5,040,517, the contents of which are made a part hereof and incorporated herein by reference. Like the invention in that reference, the present invention can be used in any application where engine cooling is accomplished by fluid means.

Figure 1:
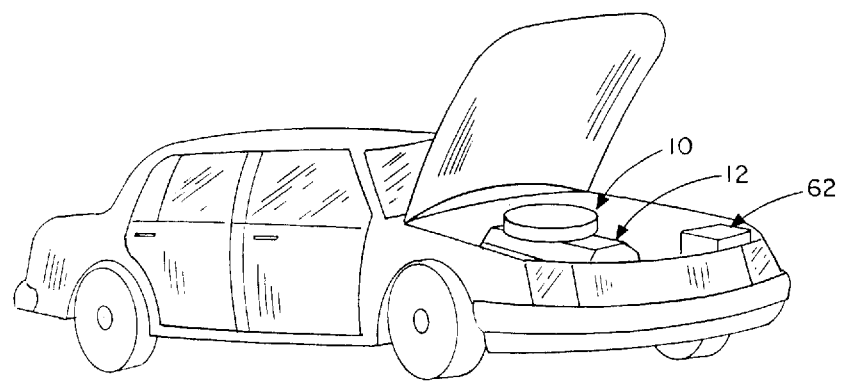
FIG. 1 is a perspective view of an automobile whose engine has been provided with the present invention.

Referring now to the drawings and particularly to FIG. 1, the automotive accessory that regulates the temperature of air and fuel entering the carburetor or fuel injection system is shown installed in the car of FIG. 1 and is generally designated as 10. It is positioned on top of the engine block 12 in a manner subsequently described. The oxygen control system, shown generally as 62, controls the inflow of pure oxygen and fuel vapors to the intake manifold. For convenience in the following detailed description, the inventive concept will be referred to as the fuel/air system.

Figure 2:
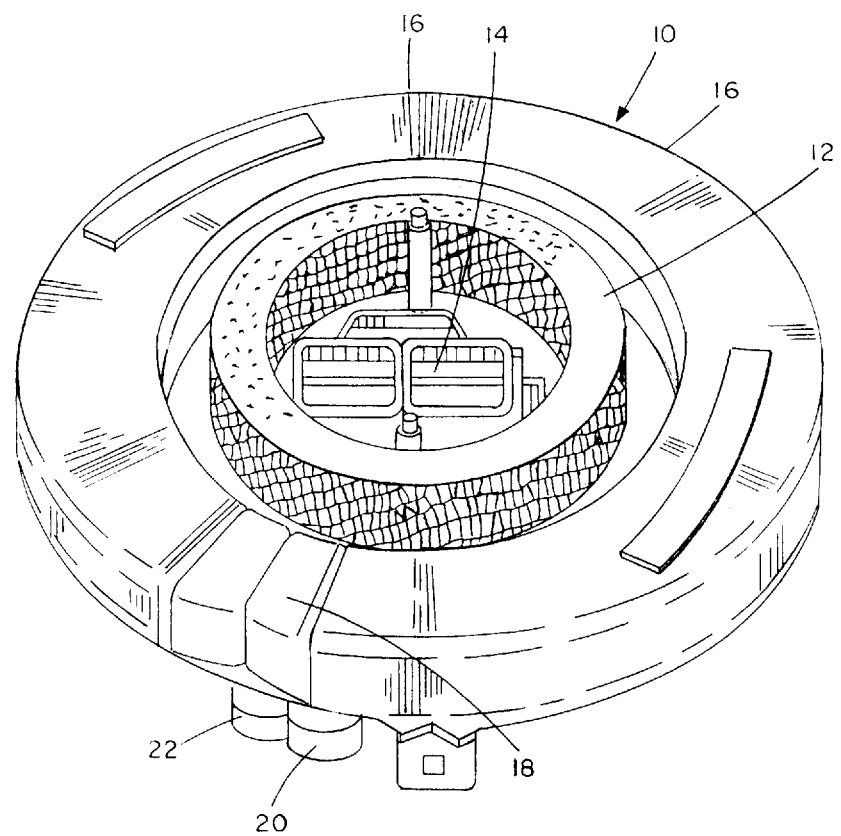
FIG. 2 is a perspective and isolated view of the heater comprising a part of the present invention which is encircling the filter located at the air intake side of the carburetor and which is provided with one or more coolant lines slightly recessed in the fins of the inside of the heater.

Many of the critical elements of the present invention are shown in FIG. 2 and include the preheater shown generally as 10 circular in configuration and encompassing an air filter 12 encircling the air intake portion of carburetor 14. Preheater 10 is provided, for heat efficiency, with a plurality of fins 16 and has coolant passage means comprising one or more fluid or coolant passage lines 18 extending throughout so that coolant may pass through the entire length of preheater 10 when introduced into lines 18 at, for example, entry 20. It flows through lines 18 and leaves at exit 22. Thus, preheater 10 effectively functions to provide a warm area for air entering the intake side of carburetor 14.

Figure 4:
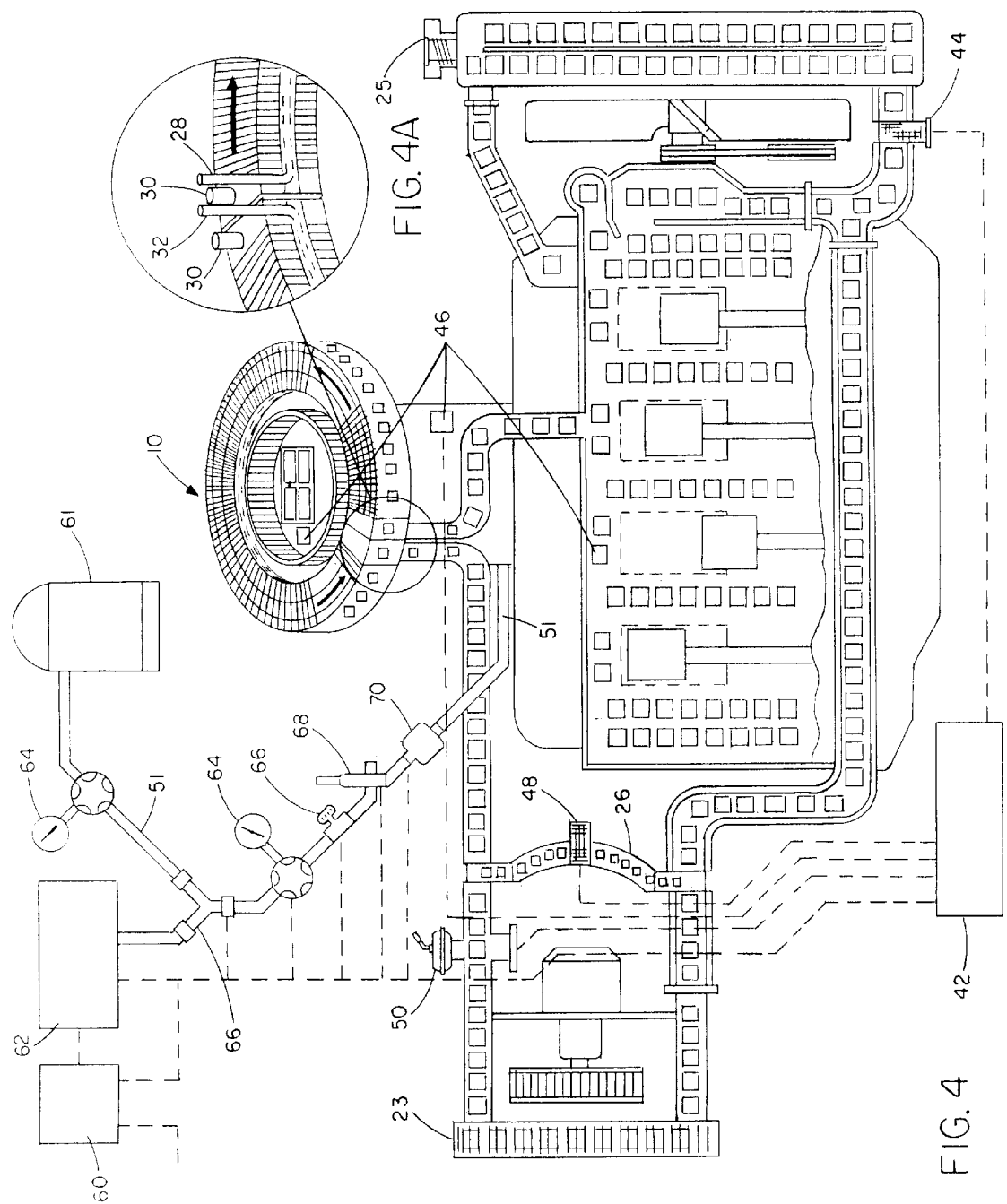
FIG. 4 is a diagrammatic view of the cooling system of an automotive vehicle showing the connection of the heater disclosed herein within the cooling system, and the crossover connection that bypasses one or more passenger heaters to maximize the efficiency of the present inventive concept during summer months when the heater is not needed, and the oxygen supply system wherein concentrated oxygen is mixed with fuel vapors to provide high quality and pollution free engine combustion.

The heating of preheater 10 is accomplished by positioning the preheater in a coolant circulating mode within the cooling system of the automotive engine. Reference is made to FIG. 4 in which preheater 10 is shown to be series-positioned within the cooling system circulatory arrangement so that coolant circulating through the block of the engine to dissipate its heat is circulated through preheater 10, continues through the passenger heater 23 located within the interior of the automobile, through the radiator 25 and then returns to the input side of the engine. The total objective of the cooling system is to remove heat from the engine and dissipate it through radiator 25; however, other functions are served such as heating the interior of the automobile during colder months when such heat is needed. In the present invention, as in my earlier U.S. Pat. No. 5,040,517, it is found to be more efficient to bypass the passenger heater section with a bypass fluid connector 26 so that no efficiency loss is encountered when passenger heater 23 is not being used during summer months.

During operation in extremely low temperatures, appropriate activating devices can be actuated to allow outside air to flow through one or more interior heaters. In that case, the car radiator is bypassed and control valve 44 is closed. This drops the temperature of the coolant passed through the engine block.

The preheater housing is completely insulated as well as the fuel lines. The oxygen tank 61 can be used in extremely cold conditions to introduce oxygen to the heat burning engine during the ignition cycle. This step aids the engine ignition prior to powering supply to the oxygen control system.

A chemical resistant housing (encasement) 51 encloses and protects the oxygen flow line shown as a dotted line inside the solid line labelled 51 in FIG. 4.

Figure 3A:
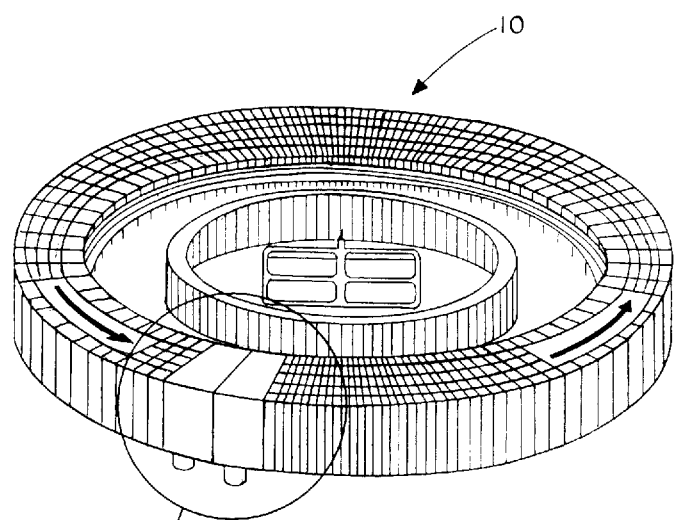
FIG. 3 is another perspective view of the heater with a slightly modified portion displayed as an insert showing the positioning of the fuel line within the coolant line to enable heating of the fuel as it passes through the interior of the heater.
Figure 3:
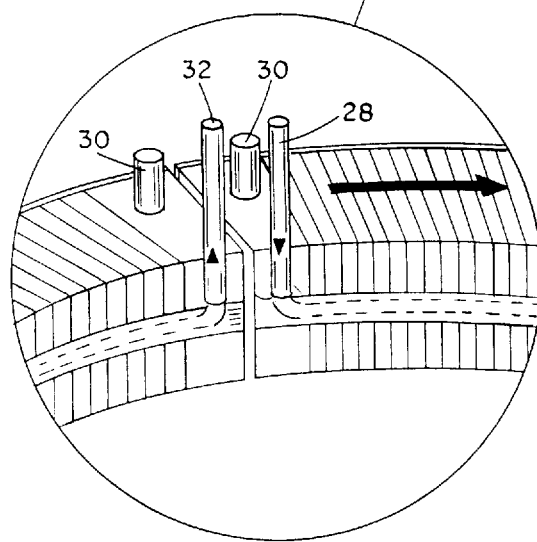
Figure 5:
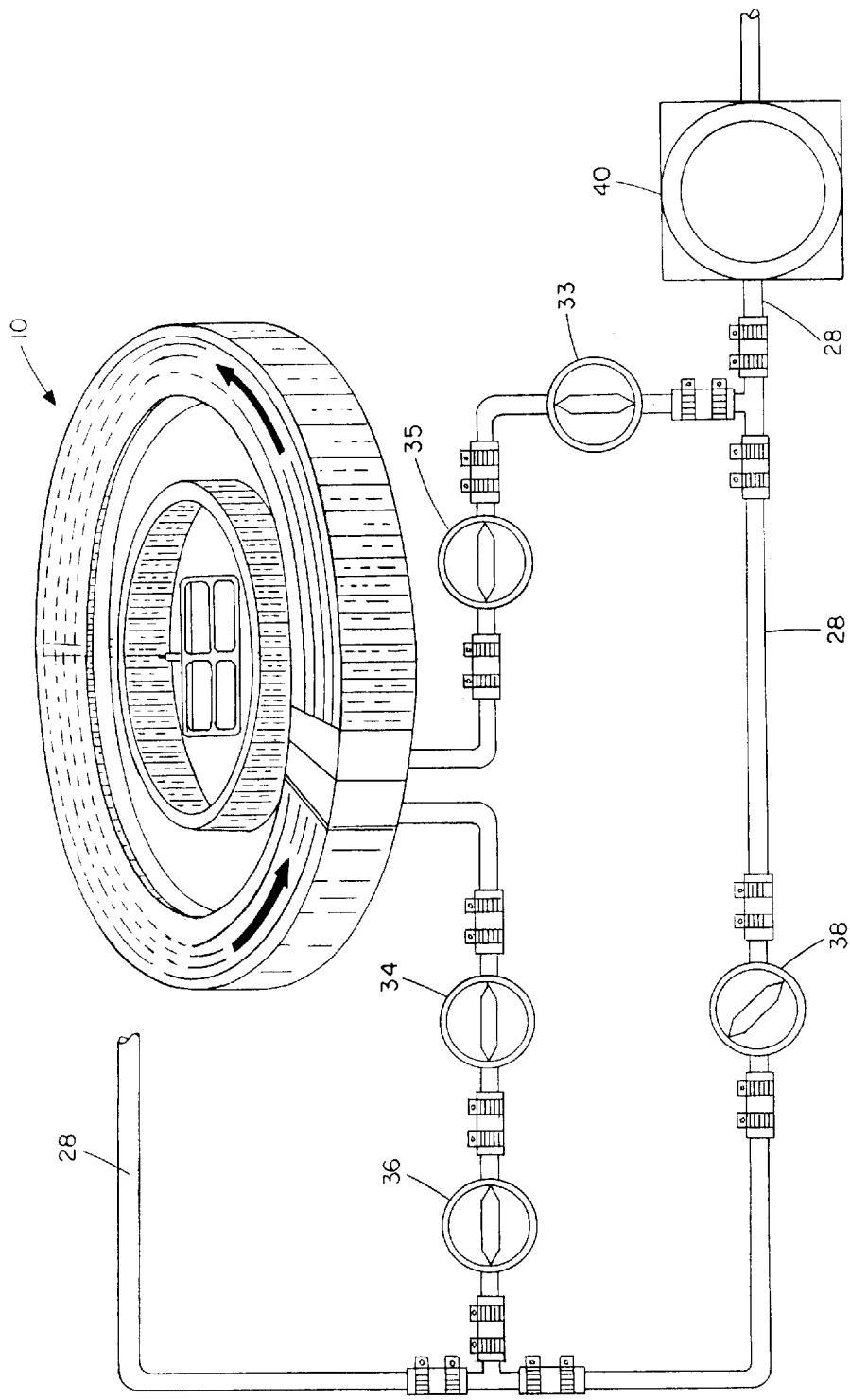
FIG. 5 is a diagrammatic view of the fuel heating system of the present invention showing the fuel line extending from the fuel pump through the heater and onto the carburetor and illustrating the various control valves that enable the adjustment of fuel heating to accommodate seasonal weather and other variables.
Figure 6:
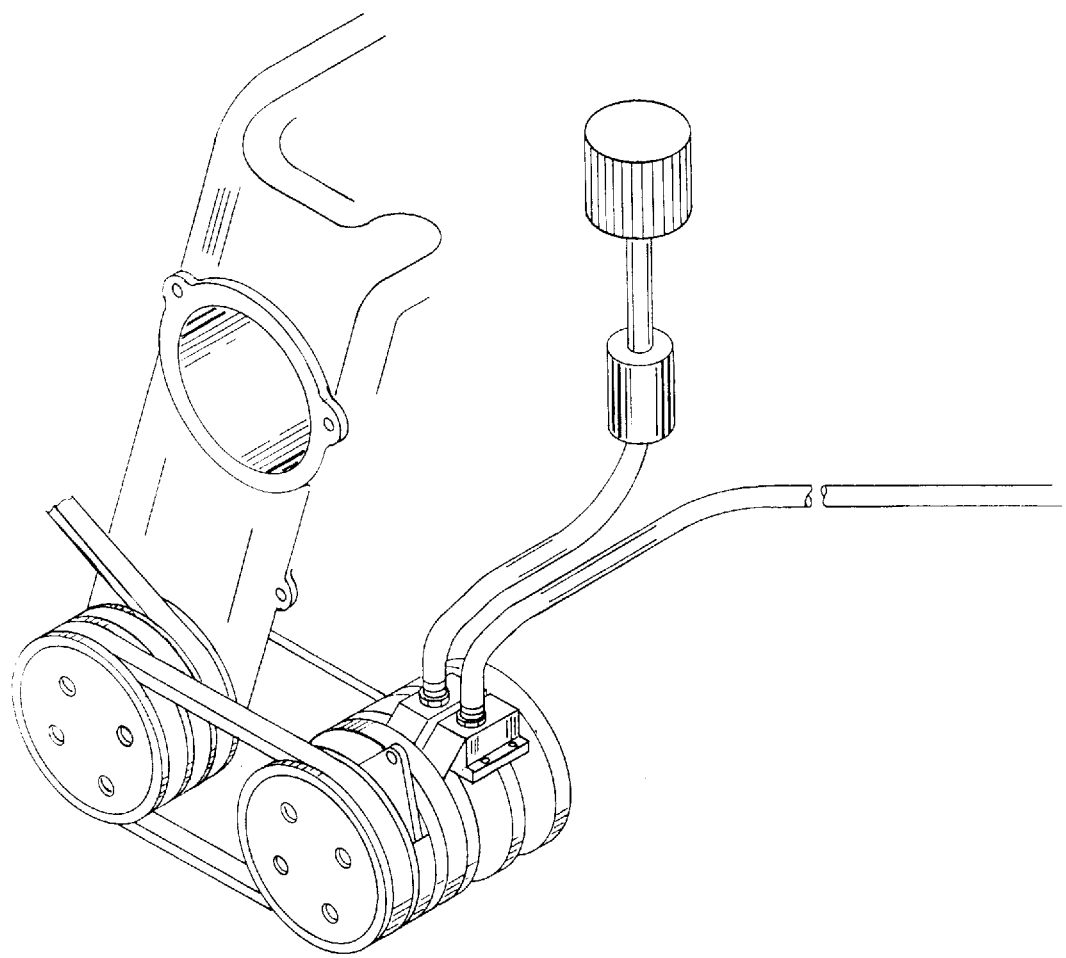
FIG. 6 is a fragmentary, perspective and enlarged view of the air compressor positioned near the engine of the automobile and connected to the oxygen control system and an air inlet filter, the filter located inside the vehicle.
Figure 7:
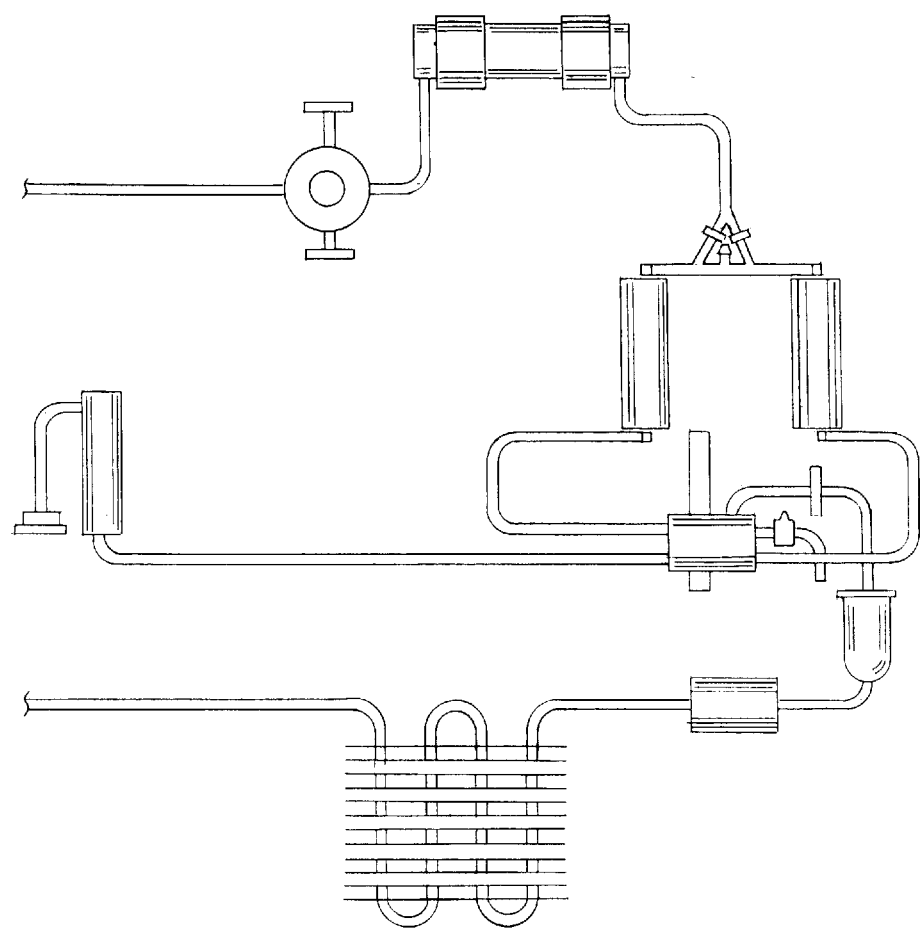
FIG. 7 is a schematic diagram of the oxygen system connected to an air compressor, an exhaust silencer and, through a crossover assembly, to the product tank.

The fuel heating portion of the fuel/air system is shown in FIG. 5 wherein heater 10 is positioned in series with the fuel line 28 extending from the fuel pump to the carburetor or fuel injection mechanism. The more specific combination of fuel line 28 with preheater 10 is shown in FIG. 3 and its enlarged insert wherein fuel line 28 extends within coolant line 30 so that hot coolant flowing within coolant line 30 heats gasoline within fuel line 28 and causes it to vaporize as it emerges from fuel line exit 32.

The series of control valves in fuel line 28 are shown in FIG. 5. Valves 33, 35 can be operated to terminate fuel to preheater 10 when one or both are placed in the closed position. Valves 34, 36 can be operated to terminate any vapor coming out of heater 10 going toward the carburetor. Valves 33, 34, 35 and 36 may be used to bypass the preheater in the event it needs repair to avoid any spilling of fuel. Valve 38 needs to be opened if the automobile is to be used until the repair is completed.

Flow control valve 38, when closed, terminates any bypass fuel around preheater 10, and it can be partially closed to regulate a quantity of fuel that bypasses heater 10 when fuel temperature needs regulating during changing weather conditions. Thus, in normal operation, fuel flows from fuel pump 40 through open valves 33, 35, through preheater 10 and then out from heater 10 through valves 34, 36 and on to carburetor 14 or a fuel injection mechanism.

To vary the temperature and quantity of coolant flow through heater 10 (FIG. 4), control means such as a computer 42 may monitor and actuate flow control valves 38, 44, 48 as well as monitor the temperature at various locations through the use of heat sensors 46. Computer 42 can also be operable to actuate or terminate coolant flow to the passenger heater through a heater control valve 50.

The present invention can be further enhanced by adding oxygen through an appropriate mechanism 64, for example, an oxygen regulator such as, for example, the REB Series Compact Regulator-Oxygen manufactured by Western Enterprises and designated Model REB-9-3. This regulator, together with an appropriate flow meter, body valve, and flashback arrestor combine to form the oxygen concentration system that enables pure oxygen to mingle with the vapor submitted through combustion and thereby reduce air pollution.

The oxygen tank 61 in FIG. 4 can be used in extremely cold conditions to introduce oxygen to the heat burning engine during the ignition cycle. This step aids the engine ignition prior to powering supply to the oxygen control system.

This system 62 as shown in FIG. 4 wherein a DC to AC inverter 60 activates system 62 directs the flow of air to regulator 64. Oxygen control system 62 removes nitrogen and hydrogen from the air and allows an endless supply of oxygen to flow on through oxygen control valve 66, oxygen flow meter 68, and flashback arrestor 70.

While most conventional carburetors utilize gasoline broken up into small droplets and mixed with air, the present invention will cause such conventional carburetors to be more fuel efficient because the preheater can be used to heat the air and fuel, thereby creating a fuel vapor mixture which is mixed with oxygen before being introduced to the engine instead of gasoline droplets alone. Moreover, the present invention is particularly helpful when applied to older model vehicles with high mileage which have commenced to burn oil during regular operation. The preheater will enable combustion of this oil/gas mixture so that the oil will burn more efficiently and will reduce the noticeable blue smoke normally associated with oil combustion and will have a favorable environmental impact since pollutants arising from burning oil will be significantly reduced by the use of oxygen control system 62 previously discussed. The invention enables the use of a lower grade of fuel to reduce operating costs and can be applicable to diesel engines.

Flow control valve 48 is installed on coolant crossover line 26 which bypasses the passenger heater when not in use. It has been found to be more efficient to bypass the passenger heater section with valve 48 so that no efficiency loss is encountered when the passenger heater is not being used during summer months.

Although one or more embodiments have been shown and described, it will be obvious to those skilled in the art that the details of construction of these particular embodiments may be modified without departing from the concept presented. It is therefore intended that the invention be limited only by the scope of the appended claims rather than by particular details of construction shown.

What is claimed is:

1. An air and fuel heating and regulating system for use with a fluid cooled internal combustion engine having a fuel feeding device, a filter, a fuel supply, a fuel pump, a fuel dispensing device, a cooling system and one or more fuel lines, and one or more combustion chambers, the system comprising: a preheater positioned adjacent the fuel feeding device and the filter and having a housing within which is formed a coolant line connected within the cooling system; fuel flow control means connected with the fuel pump, fuel line, and fuel feeding device, the fuel lines extending into and through the preheater housing coolant line and on to the fuel feeding device; fuel line valve means regulating the quantity of fuel introduced into the fuel lines extending into and through the preheater housing; coolant temperature control means connected with the cooling system regulating the flow of coolant through the preheater coolant line to control the temperature of the preheater; and pure oxygen supply means directing pure oxygen flow through the fuel flow and into the fuel dispensing device to mix with the fuel prior to the introduction to the one or more combustion chambers.

2. The system as claimed in claim 1 further comprising heater bypass means within the cooling system enabling selective connection and disconnection of portions of the cooling system each from the other.

3. The system as claimed in claim 1 wherein the preheater is substantially circular.

4. The system as claimed in claim 1 wherein the preheater carries a plurality of heat transfer fins.

5. The system as claimed in claim 1 wherein the oxygen supply means includes oxygen regulator means.

6. The system as claimed in claim 1 wherein the oxygen supply means for removing nitrogen and hydrogen from the air includes oxygen flow control means.

7. The system as claimed in claim 1 wherein the oxygen supply means includes an oxygen flow meter means.

8. The system as claimed in claim 1 wherein the oxygen supply means includes flashback arrestor means.

9. The system as claimed in claim 1 wherein the oxygen supply means includes oxygen regulator means, oxygen flow control means, oxygen flow meter means, and flashback arrestor means, the oxygen flow control means removing nitrogen and hydrogen from the air and allowing oxygen to flow through the oxygen flowmeter means and the flashback arrestor means.

10. The system as claimed in claim 2 wherein the oxygen supply means includes oxygen regulator means, oxygen flow control means, oxygen flow meter means, and flashback arrestor, the oxygen flow control means removing nitrogen and hydrogen from the air and allowing oxygen to flow through the oxygen flowmeter means and the flashback arrestor means.

11. The system as claimed in claim 9 wherein the preheater is substantially circular.

12. The system as claimed in claim 10 wherein the preheater carries a plurality of heat transfer fins.

* * * * *